3,183,060
PROCESS FOR THE PREPARATION OF DICYAN
Wilhelm Gruber, Darmstadt, Germany, assignor to Rohm
 & Haas G.m.b.H., Darmstadt, Germany
No Drawing. Filed Oct. 10, 1961, Ser. No. 144,055
Claims priority, application Germany, Oct. 29, 1960,
R 28,994
3 Claims. (Cl. 23—151)

This invention relates to a method of preparing dicyan, also referred to as cyanogen, by vapor phase oxidation of hydrogen cyanide as represented by the equation:

$$2HCN + \tfrac{1}{2}O_2 \rightarrow (CN)_2 + H_2O$$

The use of a silver catalyst and a stoichiometric excess of oxygen has already been suggested in U.S. Patent 2,712,493. Under presumably optimum conditions, with a 57 percent stoichiometric excess of oxygen, the maximum yield of dicyan is reported to be only 22.8 percent. Furthermore, the method has the disadvantages of requiring chilling of the reaction products immediately after the catalytic reaction zone to avoid formation of and apparatus blockage by polymeric hydrogen cyanide, urea and ammonium cyanate and of short periods of operation.

In accordance with the present invention, surprisingly better yields of dicyan are obtained by using less than the stoichiometric amount of oxygen theoretically required for the aforesaid oxidation of hydrogen cyanide in the vapor phase while in contact with a silver catalyst.

Optimum results, from the standpoint of selectivity, are obtainable by using from about ten to about sixty percent of the molar amount of oxygen theoretically required. Optimum yields of dicyan, at the expense however of somewhat reduced selectivity, are obtainable when up to about 90 percent the stoichiometric amount of oxygen is used. The oxygen may be supplied to the reaction zone as pure oxygen, air, a mixture of oxygen and an inert gas such as nitrogen, or any commercial source of oxygen.

The catalyst may be silver deposited upon any suitable carrier, i.e., any inert, porous base such as alumina, pumice, kieselguhr, silica gel and the like as well known in the art, or in the form of silver gauze. Suitable reaction temperatures are of the order of 400 to 800° C.

The method of the invention has the advantages, not only of providing substantially higher yields of dicyan, but also of achieving a selectivity as high as 100 percent, especially after long uninterrupted operations with the catalyst. This high selectivity, which is synonymous with minimization or absense of undesirable by-products, brings with it the further advantage of minimizing the formation of polymeric and other unwanted materials that complicate separation procedures, deposit on the catalyst and walls of the apparatus and generally contribute to inefficient operation.

It was found that even greater improvements are possible for achieving optimum results by quenching the hot reactants with a spray of weakly acid water, preferably at a pH of about 1 to 2. Sulfuric acid is preferred, e.g., in a concentration of about 0.1 to about 5 percent, but other acids, such as hydrochloric and phosphoric, and organic acids, such as formic and trichloroacetic acids, are also useful for this purpose.

The use of an acid quench downstream of the catalyst contact zone has the effect of neutralizing any ammonia that may be formed in the reaction and thereby of inhibiting formation of urea and ammonium cyanate and polymerization of unreacted hydrocyanic acid.

The acidified water is desirably sprayed countercurrently into the reaction gases. It is especially advantageous to bring the acidified water into contact with the hot gases in a heated zone of the reactor to inhibit at the outset formation of by-products which would otherwise cause obstructions in the apparatus after prolonged and continuous operation.

In addition, the acidified quench water, when used at a conversion rate of 10 to 30 percent of hydrogen cyanide fed, washes over 90 percent of the unreacted hydrogen cyanide and a few percent dicyan out of the reaction gases. These can be retained in aqueous solutions without fear of partial polymerization. The remaining hydrogen cyanide can be removed by washing with water, e.g., by passing the gases upwardly through a wash column countercurrently with respect to the wash water. The dicyan withdrawn from the head of such a column is completely free of hydrogen cyanide and can be further purified for removal of any nitrogen and oxygen residues by cooling to below the condensation temperature or by adsorbtion on activated charcoal.

By use of nozzles with vigorous spraying action, i.e., the so-called fog nozzles, it is possible completely to wash unreacted hydrogen cyanide out of the hot reaction gases with acidified quench water, thus making the use of a further wash column unnecessary.

The utility and advantages of the method of this invention will become more apparent from the following specific example included in this description to illustrate the best mode now contemplated of carrying out the invention.

EXAMPLE

A gaseous mixture of hydrogen cyanide, oxygen and nitrogen was passed downwardly through a quartz tube having an internal diameter of 24 mm., provided with three closely adjacent silver gauzes having a wire diameter of about 0.27 mm. and 64 meshes per $cm.^2$, and electrically heated to a temperature within the range of 500 to 700° C.

With new catalyst gauzes it is noticeable that maximum activity is attained after about twenty hours of operation, said maximum activity being thereafter retained for months of continuous operation.

The hot reaction gases, while still at 200 to 500° C., are quenched below the contact zone by spraying in approximately 3.5 liter per hour of water containing 0.1 to 1 percent sulfuric acid. Over 90 percent of the unreacted hydrogen cyanide and 5 to 10 percent of the dicyan produced are thereby washed out of the stream of reaction gases.

The remainder of the unreacted hydrogen cyanide is completely removed to obtain practically pure dicyan by washing the quenched gases with approximately one liter per hour of water in a bell washing column. The resulting pure dicyan can be condensed by cooling to below its boiling point of −20.5° C.

The hydrogen cyanide and dicyan dissolved in the acidified quench water are separated from the solvent and from one another by distillation and fractionation and the hydrogen cyanide is returned to the reaction zone.

The results obtained with various concentrations of oxygen and at a catalyst gauze temperature of 570° C. are tabulated below in Table I, while those obtained with a constant concentration and at varying temperatures within the preferred range are listed in Table II. In each run, the rate of feed of hydrogen cyanide was 150 ml. per minute (measured at 50° C.), and the amount of nitrogen was such that volumetric rate of oxygen plus nitrogen equalled the volumetric rate of hydrogen cyanide.

Table I

| Run No. | $O_2$, percent Theoretical | HCN, percent converted in one pass | Selectivity in percent | Yield of Dicyan, percent in one pass |
|---|---|---|---|---|
| 1 | 10 | 7.84 | 84.8 | 6.64 |
| 2 | 30 | 21.6 | 86.6 | 18.7 |
| 3 | 40 | 26.75 | 97.6 | 26.1 |
| 4 | 50 | 30 | 87.1 | 25.8 |
| 5 | 60 | 35.5 | 78.5 | 27.8 |
| 6 | 70 | 39.5 | 75.5 | 29.8 |
| 7 | 80 | 45 | 69.1 | 31.0 |
| 8 | 90 | 46.9 | 63.9 | 30 |
| 9 | 100 | 51.2 | 52.8 | 27.6 |
| 10 | 110 | 53.5 | 48.8 | 26.1 |
| 11 | 120 | 60.1 | 41 | 24.7 |
| 12 | 150 | 66.4 | 39.95 | 25.9 |

In Runs Nos. 9 to 12, solids accumulated on the catalyst gauze after several hours so that, e.g., in Run No. 9, the percentage of HCN converted and the selectivity fell to 5.52 percent and 44.8 percent, respectively, and in Run No. 12 operations had to be discontinued after a short period of time.

In the second series of test runs, the temperature was varied and the rate of oxygen was maintained at 30 percent of the stoichiometric rate.

Table II

| Run No. | Temperature ° C. | HCN, percent converted in one pass | Selectivity in percent | Yield of Dicyan, percent in one pass |
|---|---|---|---|---|
| 1 | 650 | 21.8 | 79.9 | 17.3 |
| 2 | 630 | 21.95 | 77.8 | 17.05 |
| 3 | 600 | 20.8 | 72.5 | 15.1 |
| 4 | 570 | 21.6 | 86.6 | 18.7 |
| 5 | 550 | 19.2 | 80.8 | 15.5 |

I claim:
1. In a process of oxidizing hydrogen cyanide with oxygen at 400 to 800° C. by contact with a silver catalyst in a reaction zone to prepare dicyan, the improvement which comprises feeding to the reaction zone an amount of oxygen between about 10 and 90 percent of the stoichiometric amount theoretically required according to the equation:

$$2HCN + \tfrac{1}{2}O_2 \rightarrow (CN)_2 + H_2O$$

2. The improvement defined in claim 1 wherein the hot reaction gases leaving the reaction zone are quenched by spraying with weakly acidified water.

3. The improvement defined in claim 1 wherein the amount of oxygen is between about 10 and 60 percent of the stoichiometric amount.

References Cited by the Examiner
UNITED STATES PATENTS
2,712,493   7/55   Moje _____ 23—151

MAURICE A. BRINDISI, *Primary Examiner.*